Patented Aug. 18, 1925.

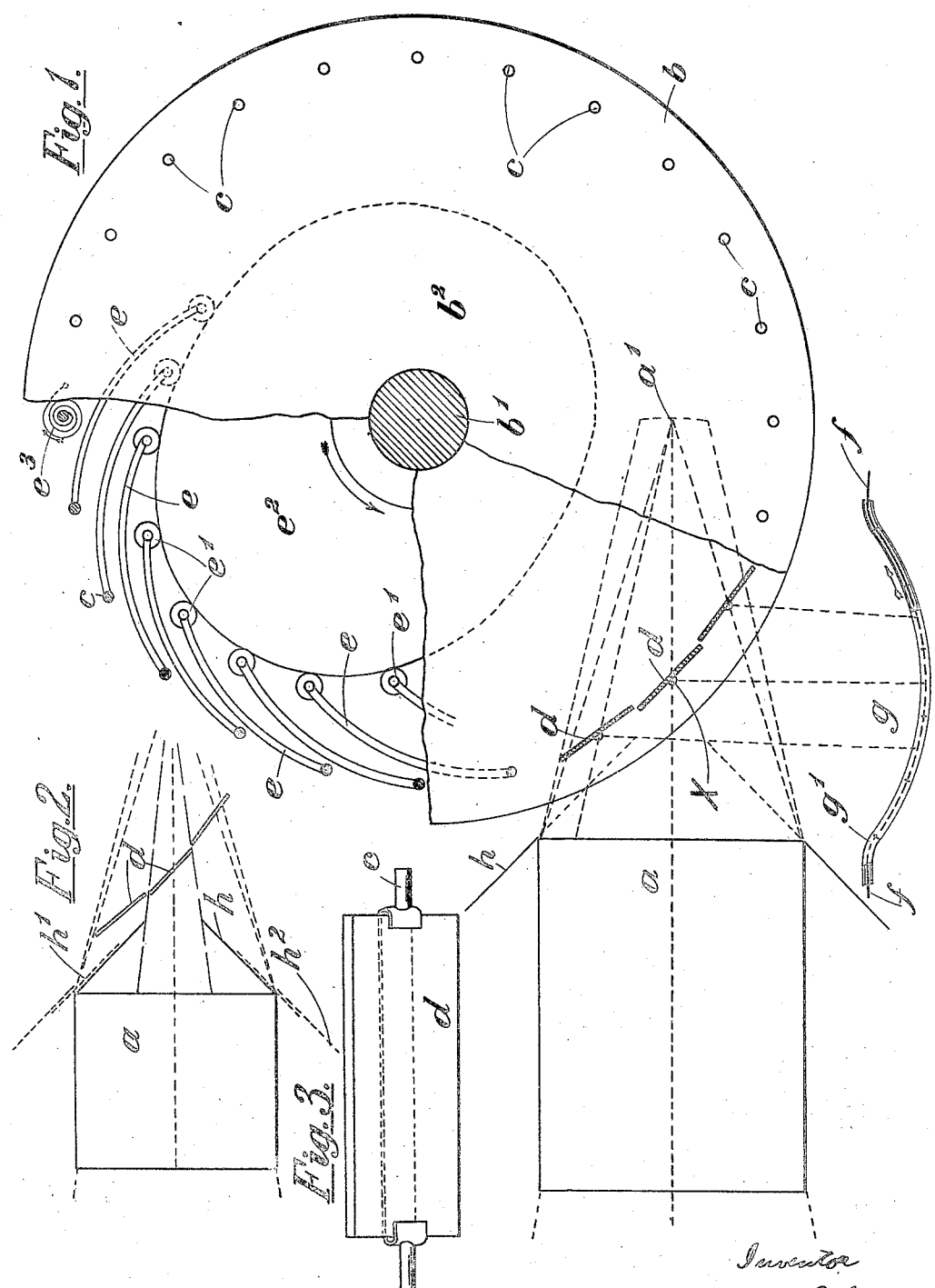

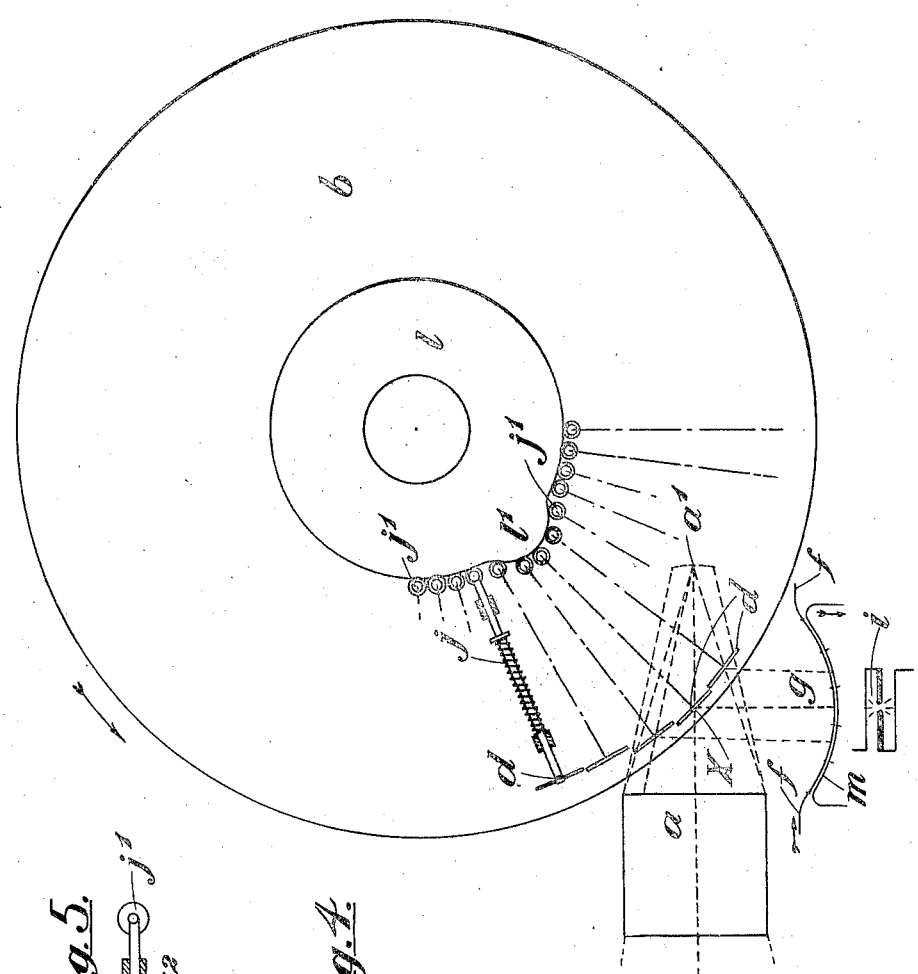
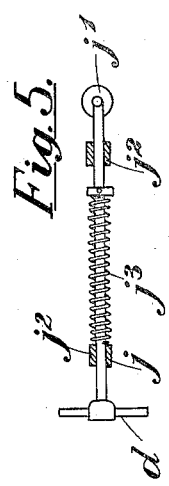

1,549,750

UNITED STATES PATENT OFFICE.

HAROLD W. DOLE, OF LONDON, ENGLAND.

CINEMATOGRAPH APPARATUS.

Application filed July 10, 1922. Serial No. 574,031.

*To all whom it may concern:*

Be it known that I, HAROLD WILLIAM DOLE, a subject of the King of Great Britain, residing at London, England, have invented certain new and useful Improvements in Cinematograph Apparatus, of which the following is a specification.

This invention relates to cinematograph apparatus and has for object to provide improved means for controlling the transmission of light in relation to the movement of the film or the like, whether the light be projected through the film as in the reproduction of moving pictures, or received upon a sensitized surface as in the taking of the pictures by a camera apparatus.

The present invention has also for object to dispense with the customary shutter for masking the film periodically during its intermittent movement, to abolish or minimize the intervals between the exposures or projections, so that practically the whole of the illumination is usefully employed, this being of special advantage in the taking of the pictures, and to allow the film or the like, whether in exposure or in projection, to travel at a substantially uniform speed.

The invention has also for its object the taking or projecting of pictures in colour by the simultaneous exposure or projection of two or more colour-components, in such a way that in projection, for example both or all the colour-components will be at all times fully represented on the screen.

With these and other objects in view, the invention provides in suitable relative position to the film a recurring series of plane reflecting surfaces, the motion of which is controlled so that during the period of activity of each reflector it remains in correct optical relation to a picture-section upon the moving film and to the focal axis of the lens system.

Preferably the reflectors are mounted upon a wheel or drum the plane of which contains the axis of the lens system; as the drum revolves the reflectors are brought successively into the path of the rays received through the lens, in the case of a camera or recording apparatus, or transmitted through the film, in the case of a projector. The positions of the reflectors are controlled by suitable means, for example by a guiding cam, slot or the like of suitable shape, the reflectors being thus caused to intersect the rays and divert them in the required direction. For example, the reflectors may intersect the axis of the rays at an angle of 45 degrees, so as to divert the illumination through a right angle.

In the line of the reflected illumination, or between the source of light and the reflectors, the sensitized film or the printed positive film is guided to travel in the plane of the reflector wheel and in a path curved to maintain the correct focus. Thus, in the case of a camera the picture received through the lens at any moment will be directed by one of the moving reflectors on to a portion of film which is moving in the proper direction and at the correct speed to correspond exactly with the travel of the reflected picture, which will therefore be impressed correctly upon the film. Before one reflector has passed completely through the rays of light, and completed the exposure of one portion of film, a second reflector may be arranged to enter the beam and commence the exposure of the following portion of film, so that the whole of the illumination may be usefully employed. Thus, there may be two or more picture lengths of film undergoing exposure at the same instant.

In the case of a projecting apparatus, the action remains substantially the same; the light transmitted through each picture is reflected by one of the moving reflectors into the focal line of the lens system, being then exhibited upon a screen or otherwise.

The invention is particularly suited for taking and/or projecting moving pictures in colours, alternate pictures being employed for a two-colour system, groups of three for a three-colour system, and so on. In this case colour screens may be provided between the lens and the reflectors, or between the reflectors and the film, or the reflectors themselves may be arranged to constitute colour filters.

The invention is hereafter described with reference to the accompanying drawing, in which:

Figure 1 illustrates the arrangement of a suitable reflector wheel in conjunction with a lens and sensitized film for recording cinematograph pictures.

Figure 2 represents the use of a variable stop in conjunction with the lens.

Figure 3 is a view of a reflector unit.

Figure 4 illustrates the arrangement of a projector for colour work.

Figure 5 is a detail of the same.

Referring to Figure 1, the lens a consisting for example of a standard three-inch projector lens, having a virtual focus at a', is mounted with its axis in the central plane of a wheel b rotatable upon the spindle b' and driven at constant speed in any convenient manner. The wheel b comprises two circular cheek-plates or discs b' b², around which are spaced at exactly even radial distances a number of transverse pivots c supporting reflectors d; in the construction illustrated in Figure 1, the pivoted reflectors are twenty-four in number. Each reflector d (see Figure 3) is formed by a rectangular plate of suitable material such as highly polished stainless steel, speculum metal or silvered glass, of length approximately equal to the transverse distance between the cheek-plates of the wheel, and of width sufficient to bring the edges of adjacent reflectors into close proximity without actual contact.

The pivots c extend through the cheek-plates b' on one side of the wheel b and are fitted with crank-arms e, the ends of which carry rollers e' adapted to bear upon the periphery of a stationary cam e², springs e³ being provided if desired to maintain the rollers in contact with the cam surface.

The sensitized film f is guided by any suitable means, so that for a portion of its travel it moves in a curved arc as indicated at g, this path being concentric with the point X at which the lens-axis a a' intersects the moving reflectors d.

The guides may consist for example of sheet metal strips g' bent to U-section and curved to the arc g, the edges of the film moving in the troughs of the U-section guides. In the position shown, a portion of the illumination transmitted by the lens-system will be diverted by the reflector in line with the axis, to a focus at the middle point of the arc g the film being thereby impressed with a record of the object.

The controlling means for the reflectors d produces an angular movement of the reflectors during the time of their travel through the convergent beam of light from the lens, such that the focus of the reflected light moves along the arc g in exact relation to the travel of the film along the curved guide; the speed of the wheel, the rate of travel of the film and the shape of the cam are so determined as to maintain the focussed illumination in exact register upon the constantly moving film. With the arrangement illustrated, if the angular velocity of the film along the circular arc g is equal to that of the drum, the crank-arms e will be required to produce an angular movement of the pivoted reflectors in relation to the drum equal to half the angular velocity of the latter and in the contrary direction, so that the resultant angular velocity is one half that of the drum and in the same direction as the latter, while the axis of the reflected beam of light will have the same angular velocity as the film. The cam e² is so shaped that its active portion, engaging the rollers of the cranks controlling the reflectors actually within the illumination, produces the required movement of these crank arms, the remaining portion of its circumference being shaped to any convenient curvature for smooth working.

Essentially such reflecting surface, during its active period, that is, while passing through the beam, rotates about a stationary virtual axis at the point X, which is located at the intersection of the lens-axis with the pitch circle of the pivots and forms also the centre of the arc g along which the film travels.

It will be noted that in this construction, the twenty-four mirrors in the wheel b, the height of or distance from centre to centre of the pictures will be one twenty-fourth of the complete circumference of which the arc g forms a part.

It will be obvious that two or more of the reflectors may be in operation simultaneously, the exposure of the different sections of the film continuing during the whole or the greater portion of their travel along the arc g.

As shown in Figure 2, a diaphragm or stop device may be provided within the lens-system, as indicated at h, to adjust the depth and/or the horizontal width of the beam according as it is desired to expose one or more sections of film at a time. Thus, for example, for single-colour work the stops may be set to cover only a single section of film, but for multi-colour work the stop may be opened, as indicated in dotted lines at h' h² to bring two, three or more reflectors into simultaneous action, the reflected light being then received upon two, three or more consecutive film sections either immediately contiguous or separated by suitable gaps or intervals.

In the case of a projector apparatus, the source or sources of light will be placed so as to transmit light through the film upon the moving reflectors, and thence through the projector lens.

The invention is not limited to the mounting and operation of the reflectors by the particular means described. For example, Figure 4 illustrates, in the case of a projector apparatus, an alternative means for operating the reflectors.

In this construction, the source of light i is placed so as to transmit light through the film f upon the moving reflectors d which, instead of being pivoted upon the drum b are mounted upon plungers j moving with the drum and having a rectilinear sliding motion in approximately radial relation thereto, the plungers and mirrors having the same angular velocity as the drum. In this case, with the same size of reflectors as in the previous construction, the diameter of the drum $b$ and the number of reflectors $d$ will be doubled as compared with the arrangement illustrated in Figure 1, the positions of the lens $a$ and film $f$, and the curvature of the guiding path $g$ for the latter remaining as before, and the height or centre-to-centre distance of each picture-section of the film being still the same fraction of the complete circle corresponding to the arc $g$. These relative proportions may be varied if required, as will be obvious to those skilled in the art.

The light reflected from the mirrors $d$ will pass through the lens $a$ and produce a stationary image upon the screen $k$. When two or more picture sections are in operation simultaneously, their reflections will be superimposed upon the screen, the earliest of the several pictures being constantly removed and a later picture added. In colour projection the two or more series of colour images will at all times be represented on the screen.

Colour screens may be provided at any convenient positions to filter the light passing to the respective film-sections. In Figure 4, I have shown a filter in the form of a band $m$ having recurring series of filter sections coloured red, green and blue-violet, this filter-band passing between the source of light and the film, so that its respective sections register with the corresponding pictures of the film, the filter being advanced continuously by any suitable and well known means.

In this construction the controlling means for the reflectors are arranged to reciprocate the plungers $j$ to the extent required to maintain the previous conditions of alignment of the reflecting surfaces $d$ with the stationary virtual axis X during their period of activity. By way of example, there is illustrated a cam $l$ having at one point in its circumference a swell or protuberance $l'$ which engages the rollers $j'$ at the inner ends of the plungers $j$ to produce an outward motion and return of the plungers while the mirrors $d$ are passing through the illumination. The mirrors being carried by the revolving drum have the same angular velocity of the latter, and consequently the diversion of the reflected rays will have twice this angular velocity to conform to the motion of the film $f$, the reflecting surfaces being maintained in alignment with the stationary axis X during their period of activity.

Figure 5 shows the detail of the plunger $j$, with its roller $j'$, guides $j^2$ and return spring $j^3$ which holds the roller in contact with the cam $l\ l'$.

Having thus described my invention what I claim is:—

1. A cinematograph apparatus, comprising a wheel rotating at substantially uniform speed, a film travelling at substantially uniform speed along a circular path, said circular path lying in the plane of said wheel, reflecting surfaces mounted upon said wheel, pivots secured to said reflecting surfaces, the axes of said pivots lying in the reflecting planes of said reflecting surfaces, said pivots rigidly located in relation to said wheel, means for controlling a secondary motion of said reflecting surfaces, and means for transmitting the illumination.

2. A cinematograph apparatus, comprising a wheel rotating at substantially uniform speed, a film travelling at substantially uniform speed along a circular path, said circular path lying in the plane of said wheel, pivots secured to said reflecting surfaces, the axes of said pivots lying in the reflecting planes of said reflecting surfaces, said pivots rigidly located in relation to said wheel, means for maintaining reflecting surfaces mounted upon said wheel, said reflecting surfaces in alignment with the centre of said circular path during a portion of their rotary movement, and means for transmitting illumination to and from said reflectors.

3. A cinematograph apparatus, comprising a rotating wheel, reflectors mounted upon said wheel, pivots secured to said reflecting surfaces, the axes of said pivots lying in the reflecting planes of said reflecting surfaces, said pivots rigidly located in relation to said wheel, a continuously moving film guided in a circular path in the plane of rotation of said wheel, a stationary cam coaxial with said wheel, mechanical controlling means between said cam and said reflectors, said controlling means maintaining said reflectors aligned with the centre of said circular path during a portion of the rotation of said wheel, and means for transmitting illumination between said reflectors in turn and the sections of said film whilst said reflectors are aligned with the centre of said circular path.

4. A cinematograph apparatus, comprising a wheel, reflecting surfaces mounted upon said wheel and participating in its rotary motion, means for transmitting illumination along an axis lying in the plane of said wheel, said reflectors adapted to intersect said illumination, a single cam controlling said reflectors to divert said illumination between a stationary axis and a rotary axis, and means for guiding a film along a part-circular path lying in the plane of said wheel and concentric with the pole of said rotary axis.

5. A cinematograph apparatus, comprising a wheel, said wheel receiving a substantially constant rotary motion, reflectors mounted upon said wheel, pivots secured to said reflecting surfaces, the axes of said pivots lying in the reflecting planes of said reflecting surfaces, said pivots rigidly located in relation to said wheel, means for producing a secondary motion of said reflectors, a circular film-guide lying in the plane of said wheel and having its centre on the path of said reflectors, and means for transmitting illumination to and from said reflectors during their proximity to the centre of said film-guide, while said reflectors remain in correct optical relation to the moving film.

6. A cinematograph apparatus, comprising a drum, said drum receiving a substantially constant rotary motion, spindles journaled in said drum parallel to its axis of rotation, reflectors mounted upon said spindles, crank arms secured to said spindles, a stationary cam coaxial with said drum, said crank arms controlled by said cam to produce a secondary movement of said reflectors, a film guide lying in the plane of said drum and curved to a circular arc, the centre of said arc lying on the path of said reflectors, and means for transmitting illumination to and from said reflectors.

7. A cinematograph apparatus, comprising a drum, said drum receiving a substantially constant rotary motion, spindles journaled in said drum parallel to its axis of rotation, reflectors mounted upon said spindles, crank arms secured to said spindles, a stationary cam coaxial with said drum, said crank arms controlled by said cam to produce a secondary movement of said reflectors, means for transmitting illumination to and from said reflectors, and means for guiding a constantly moving film along a part-circular path in register with said illumination.

8. A cinematograph apparatus, comprising a wheel rotating at substantially uniform speed, a film travelling at substantially uniform speed along a circular path, said circular path lying in the plane of said wheel, reflecting surfaces mounted upon said wheel, pivots secured to said reflecting surfaces, the axes of said pivots lying in the reflecting planes of said reflecting surfaces, said pivots rigidly located in relation to said wheel, means for controlling a secondary motion of said reflecting surfaces, the resultant angular velocity of said reflectors being one half that of said film, and means for transmitting the illumination.

9. A cinematograph apparatus, comprising a wheel rotating at substantially uniform speed, a film travelling at substantially uniform speed along a circular path, said circular path lying in the plane of said wheel, reflecting surfaces pivotally mounted upon said wheel, transverse pivots for said reflecting surfaces, said pivots lying in the actual reflecting planes of said surfaces, means for controlling a secondary motion of said reflecting surfaces around said pivots, and means for transmitting the illumination.

10. A cinematograph apparatus comprising a wheel rotating at substantially uniform speed, a film travelling at substantially uniform speed along a circular path, said circular path lying in the plane of said wheel, reflecting surfaces directly mounted upon said wheel, tranverse pivots for said reflecting surfaces, the axes of said pivots lying in the reflecting planes of said surfaces, said pivots located upon a pitch circle concentric with said wheel and passing through the intersection of said reflectors with the axis of the illumination, means for controlling a secondary motion of said reflecting surfaces around said pivots, and means for transmitting the illumination.

11. A cinematograph apparatus comprising a wheel rotating at substantially uniform speed, a film travelling at substantially uniform speed along a circular path, said circular path lying in the plane of said wheel, reflecting surfaces mounted upon said wheel, pivots secured to said reflecting surfaces, the axes of said pivots lying in the reflecting planes of said reflecting surfaces, said pivots rigidly located in relation to said wheel, means for controlling a secondary motion of said reflecting surfaces, and means for transmitting the illumination simultaneously to a plurality of said reflecting surfaces.

12. A cinematograph apparatus, comprising a wheel rotating at substantially uniform speed, a film travelling at substantially uniform speed along a circular path, said circular path lying in the plane of said wheel, reflecting surfaces mounted upon said wheel and participating in its rotary motion, means for controlling a secondary motion of said reflecting surfaces, the resultant angular velocity of said reflectors being one half that of said film, and means for transmitting the illumination simultaneously to a plurality of said reflecting surfaces, each such plurality of said reflecting surfaces corresponding to a complete colour-series of pictures upon said film.

13. A cinematograph apparatus, comprising a wheel, reflecting surfaces mounted illumination along an axis lying in the plane upon said wheel, means for transmitting of said wheel, said reflectors adapted to intersect said illumination, a single cam controlling said reflectors to divert said illumination between a stationary axis and a rotary axis, a colour-picture film, and means for guiding said film along a part-circular path lying in the plane of said wheel and concentric with the pole of said rotary axis, regular sequences of said reflecting surfaces corresponding to a complete colour-series of pictures upon said film.

14. A cinematograph apparatus, comprising a wheel, reflecting surfaces mounted upon said wheel, and participating in its rotary motion, means for transmitting illumination along an axis lying in the plane of said wheel, said reflectors adapted to intersect said illumination, means for controlling a secondary motion of said reflectors to divert said illumination between a stationary axis and a rotary axis, means for guiding a film along a part-circular path lying in the plane of said wheel and concentric with the pole of said rotary axis, said film having successive picture sections corresponding to individual colour-components, and means for transmitting illumination simultaneously to a plurality of said reflecting surfaces corresponding to a complete colour-series of pictures upon said film.

15. A cinematograph apparatus, comprising a recurring series of plane reflecting surfaces, a wheel upon which said surfaces are mounted, means for transmitting illumination along an axis lying in the plane of said wheel to a plurality of said reflecting surfaces simultaneously, a single cam controlling said reflecting surfaces to divert said illumination between a stationary axis and a rotary axis, means for guiding a film along a part-circular path lying in the plane of said wheel and concentric with the pole of said rotary axis, said film having successive picture-sections corresponding to individual colour-components, and said plurality of reflecting surfaces co-operating respectively with the picture-sections of a complete colour sequence.

16. A cinematograph apparatus, comprising a wheel rotating at substantially uniform speed, a colour-picture film travelling at substantially uniform speed along a circular path lying in the plane of said wheel, reflecting surfaces mounted upon said wheel, pivots to which said reflecting surfaces are secured, the axes of said pivots lying in the reflecting planes of said reflecting surfaces, said pivots rigidly located in relation to said wheel upon a pitch-circle concentric with its axis of rotation, means for transmitting illumination along an axis lying in the plane of said wheel, said reflectors adapted to intersect said illumination, and means for controlling a secondary motion of said reflectors upon their pivots to divert said illumination between a stationary axis and a rotary axis, the circular path of said film being concentric with the pole of said rotary axis, and regular sequences of said reflecting surfaces corresponding to a complete colour-series of pictures upon said film.

In testimony whereof I hereunto affix my signature.

HAROLD W. DOLE.